United States Patent
Bestenreiner et al.

[15] 3,698,810
[45] Oct. 17, 1972

[54] METHOD AND ARRANGEMENT FOR MANUFACTURING DIFFUSION LENSES OF ARBITRARY INDICATRIX

[72] Inventors: Friedrich Bestenreiner, Gruenwald; Walter Weiershausen, Ottobrunn; Paul Janovjak, Munich, all of Germany

[73] Assignee: AGFA-Gevaert Aktiengesellschaft, Leverkusen, Germany

[22] Filed: March 15, 1971

[21] Appl. No.: 145,080

[30] Foreign Application Priority Data

March 14, 1970 Germany..........P 20 12 191.9

[52] U.S. Cl. ................355/71, 350/160 P, 350/162, 355/77
[51] Int. Cl. ............................................G03b 27/76

[58] Field of Search ........355/71, 77; 350/162, 160 P

[56] References Cited

UNITED STATES PATENTS 2,959,105  11/1960  Sayanagi..................355/71 X
3,178,997  4/1965  Kelly..........................355/71

Primary Examiner—Samuel S. Matthews
Assistant Examiner—Richard A. Wintercorn
Attorney—Michael S. Striker

[57] ABSTRACT

Diffusion lens with desired light intensity distribution manufactured photographically by recording an image of an illuminated diffusing lens of standard characteristic after spacial frequency filtering of the light of said lens.

12 Claims, 3 Drawing Figures 3,698,810

METHOD AND ARRANGEMENT FOR MANUFACTURING DIFFUSION LENSES OF ARBITRARY INDICATRIX

BACKGROUND OF THE INVENTION

This invention relates to a method and arrangement for manufacturing diffusing lenses of arbitrary indicatrix.

Conventional diffusing disks such as ground glass plates, frosted glass plates, etc. generally effect a statistically equal distribution of light in all directions, that is, if the light distribution resulting from illumination from a point source is determined in all directions in the space lying behind the diffusing lens, then a rotationally symmetrical distribution results around a perpendicular to the plane of the diffusing lens. However, instances arise in which such a rotationally symmetrical distribution of light intensity is not desirable. This may, for instance, be the case for projection walls which are to reflect light preferentially in certain directions in which the viewer is situated.

SUMMARY OF THE INVENTION

It is an object of this invention to manufacture a diffusing lens having such an indicatrix, that is an intensity distribution which departs from the rotationally symmetrical distribution and furnishes light preferentially in some regions while suppressing light in other regions.

In accordance with this invention, a diffusion lens of such arbitrary indicatrix is manufactured photographically by creating an optical image of a diffusing lens after spacial frequency filtering of the light emanating from said lens.

The term "spacial frequency filtering" refers to an arrangement in which the object whose image is to be recorded is situated in the focal plane of a transformation lens in whose other focal plane filtering means for spacial frequency filtering are arranged. These filtering means are simultaneously situated in the focal plane of a retransformation lens which has the same focal length as the transformation lens. In the other focal plane of the retransformation lens, a photographic plate is arranged. The image recorded on the photographic plate will be greatly affected by the filtering taking place between the two transformation lenses. For example, if in the filtering plane an aperture plate having a very narrow slit is placed, then the photo plate will contain a structure of lines or strips. This structure will tend, after developing, bleaching or rehalogenization, to reflect light preferentially into what was the plane of the slit during the recording. In regions outside of this plane, must less light is diffused.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
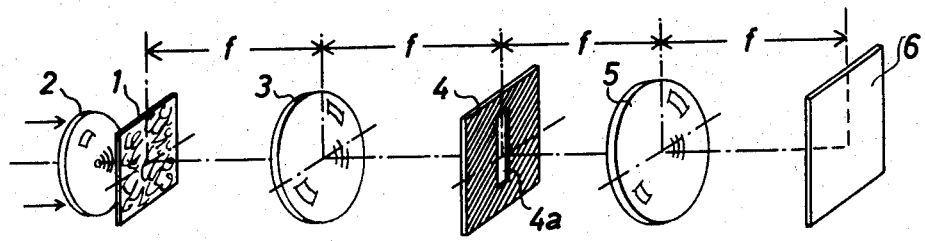
FIG. 1 is an arrangement for recording a diffusing lens, in accordance with the present invention.

A preferred embodiment of the present invention will now be described with reference to the drawing.

FIG. 1 shows a diffusing lens, 1, which is illuminated with monochromatic light in a conventional manner by means of a condenser 2. The light source is preferentially a laser whose beam has been spread in a conventional manner by another lens. The diffusing lens 1 is situated in the focal plane of a so-called transformation lens 3, in whose other focal plane an aperture plate 4 is situated. The aperture plate 4 has a slit 4a, whose width is very small relative to its length. Depending on the desired intensity distribution (indicatrix) which the diffusing lens to be manufactured is to have, the aperture plate may contain other light transmissive sections or openings, such as a plurality of parallel slits, or circular sections, or a grating may be used. Aperture plate 4 is also situated in the focal plane of a retransformation lens 5 which has substantially the same focal length as the transformation lens. In the second focal plane of the retransformation lens is situated a photographic recording means such as a photoplate 6. It should be repeated that diffusing lens 1 may comprise any kind of light diffusing means such as opal plates; diffusing disks, etc.

The manufacture of diffusing lens of arbitrary indicatrix results from recording on the photographic plate of an image of the given diffusing lens after spatial frequency filtering. In this operation, the illumination must be very carefully adjusted to an optimal value. This optimal value depends very much on the light source used on the photographic recording material and on the chemical processes which are to follow the recording. Such optimum illumination is generally determined experimentally. However the general rule may be used that the difference in the optical path length between strongly illuminated and weakly illuminated parts of the photographic plate after developing and bleaching should be in the order of a half a wavelength of the illuminating light.

After illumination, the photo plate 6 is developed and bleached by known methods. After this bleaching, the photo plate is completely transparent, but a relief image corresponding to the previous variation in density remains. This relief image causes the desired intensity distribution.

Figure 2:
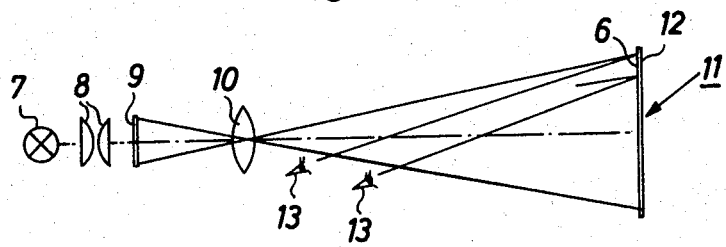
FIG. 2 is a projection arrangement using a screen manufactured in accordance with the present invention.

FIG. 2 shows a projection arrangement having a light source 7, a double condenser 8, and the copy to be projected, 9. The copy to be projected, such as a slide, is projected onto a projection wall 11 by an objective lens. The projection wall 11 comprises a diffusing disk 6 manufactured in accordance with the arrangement of FIG. 1, and a diffuse or mirror-like reflecting screen 12 which is arranged behind the diffusing lens 6. The relief image on diffusing lens 6 acts as a plurality of statistically distributing cylinder lenses. Thus the light emanating from slide 9, insofar as it is reflected by projection wall 12, is reflected mainly into the plane which extends horizontally forward from the projection wall or, for different angles of indicence, emanating from the projector into other planes which are not perpendicular to the projection wall. The eyes of a viewer, labelled 13, are arranged in this plane so that the maximum light utilization results. Of course in regions in which little light is reflected because of the diffusion characteristic of lens 6, a much darker picture results.

The diffusing lens 6 must not necessarily be manufactured photographically. Generally it is sufficient if one sample is manufactured the above-described way. This sample is then reproduced by electroforming. For this purpose the surface structure of the gelatin is transformed into a master form by galvanization. This master is then reproduced through heat embossing of a thermoplastic synthetic. This technique of molding is known for example from the manufacture of phonograph records and does not require further explanation here.

Diffusing lenses of the above-described type may also be used for diffusing transmitted light in accordance with any un-symmetrical desired diffusion characteristic.

Figure 3:
FIG. 3 is a photograph of a diffusing lens manufactured in accordance with the arrangement of FIG. 1.

FIG. 3 shows a diffusing lens manufactured in accordance with the process and arrangement illustrated in FIG. 1. For this the slit in the Fourer plane was 1 millimeter broad and 48 millimeters long. The picture shown has been magnified considerably. It should be noted that the lens is actually transparent to normal viewing. A picture as shown in FIG. 3 only results from illumination at a slant in front of a dark background.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Method for processing a photographic plate to create a diffusion lens having a desired intensity distribution, comprising, in combination, the steps of creating diffused light having a known intensity distribution; subjecting said diffused light to spacial frequency filtering; creating a density distribution corresponding to the intensity distribution of said so filtered light on said photographic plate; and processing said photographic plate to create a relief image corresponding to said density distribution, said photographic plate having said relief image constituting said diffusion lens having said desired intensity distribution.

2. A method as set forth in claim 1, wherein said spacial frequency filtering comprises passing said diffused light through an aperture having a shape corresponding to said desired intensity distribution.

3. A method as set forth in claim 1, further comprising the step of reproducing said photographic plate having said relief image, thereby producing additional ones of said lenses having desired intensity distributions.

4. A method as set forth in claim 3, wherein said step of reproducing comprises electroforming.

5. An arrangement for manufacturing a diffusion lens having a desired indicatrix, comprising, in combination, a transformation lens having a focal length and a first and second focal plane; a retransformation lens having substantially the same focal length as said transformation lens and having a first and second focal plane; means mounting said transformation lens and said retransformation lens in such a manner that said second focal plane of said transformation lens substantially coincides with said first focal plane of said retransformation lens; diffusing means mounted in said first focal plane of said transformation lens; means illuminating said diffusing means with a predetermined intensity distribution over the surface thereof; light filtering means mounted in said second focal plane of said transformation lens and thereby in said first focal plane of said retransformation lens; and photographic recording means mounted in said second focal plane of said retransformation lens.

6. An arrangement as set forth in claim 5, wherein said predetermined intensity distribution is a uniform distribution.

7. An arrangement as set forth in claim 5, wherein said illuminating means comprise monochromatic illuminating means.

8. An arrangement as set forth in claim 7, wherein said illuminating means comprise a laser.

9. An arrangement as set forth in claim 5, wherein said light filtering means comprise an aperture plate having a light transmissive section of determined shape.

10. An arrangement as set forth in claim 9, wherein said light transmissive section is a slit having a width which is very narrow relative to its length.

11. An arrangement as set forth in claim 10, wherein said aperture plate comprises a plurality of slits.

12. An arrangement as set forth in claim 11, wherein said plurality of slits comprises a plurality of parallel slits.

* * * * *